United States Patent [19]

Savage

[11] Patent Number: 4,479,300
[45] Date of Patent: Oct. 30, 1984

[54] METHOD AND APPARATUS FOR ASSEMBLING BATTERY CELL ELEMENTS

[75] Inventor: Douglas R. Savage, Park Ridge, Ill.

[73] Assignee: GNB Batteries Inc., Mendota Heights, Minn.

[21] Appl. No.: 475,279

[22] Filed: Mar. 14, 1983

[51] Int. Cl.³ .............................................. H01M 6/00
[52] U.S. Cl. .................................... 29/623.1; 29/730; 29/786; 198/420; 414/42
[58] Field of Search ............................ 29/623.1–623.5, 29/730, 731, 771, 783, 786, 793, 791; 414/42, 41; 198/420, 421

[56] References Cited

U.S. PATENT DOCUMENTS 3,545,589 12/1970 Keller .................................. 198/420
4,406,057 9/1983 Oswald et al. ...................... 29/623.4
4,417,390 11/1983 Simonton .............................. 29/730

FOREIGN PATENT DOCUMENTS 1021537 11/1977 Canada .................................. 29/786
64943 11/1982 European Pat. Off. ........... 29/623.1

Primary Examiner—Howard N. Goldberg
Assistant Examiner—P. W. Echols
Attorney, Agent, or Firm—Augustus J. Hipp

[57] ABSTRACT

A method and apparatus for reliably assembling battery cell elements having relatively large numbers of electrode plates separated by a single interleaved spacer. The apparatus includes a rotatable element-assembly drum formed with a plurality of plate receiving slots at circumferentially spaced intervals about the periphery thereof, a first plate supply station for directing first electrode plates of common polarity into successive plate-receiving slots as the drum is rotated, a separator-sheet supply station for positioning a pre-folded strip of separator sheet onto the rotating drum with downwardly-opening folds of the sheet each encompassing a respective one of the first plates, a second electrode-plate supply station for directing second plates of a common polarity opposite to the first plates into respective upwardly-opening folds of the separator sheet carried by the rotating drum, and an element-stack discharge ramp for continuously removing from the rotary drum the strip of separator sheet with the first and second plates occupying alternative folds on opposite sides thereof. In the illustrated apparatus, the continuous strip of separator sheet is cut at the discharge ramp following discharge of the requisite number of plates for the assembled cell element.

36 Claims, 9 Drawing Figures

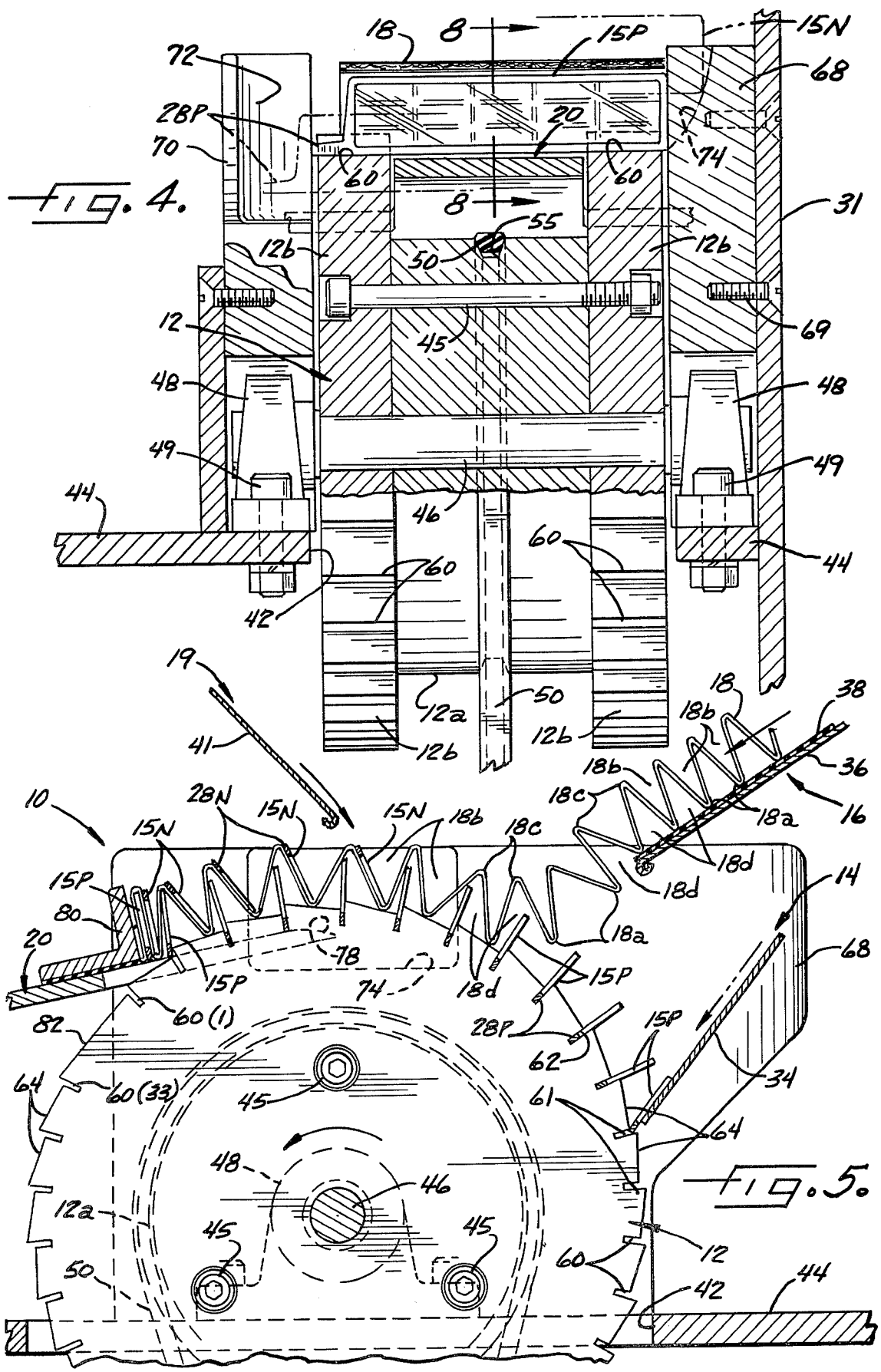

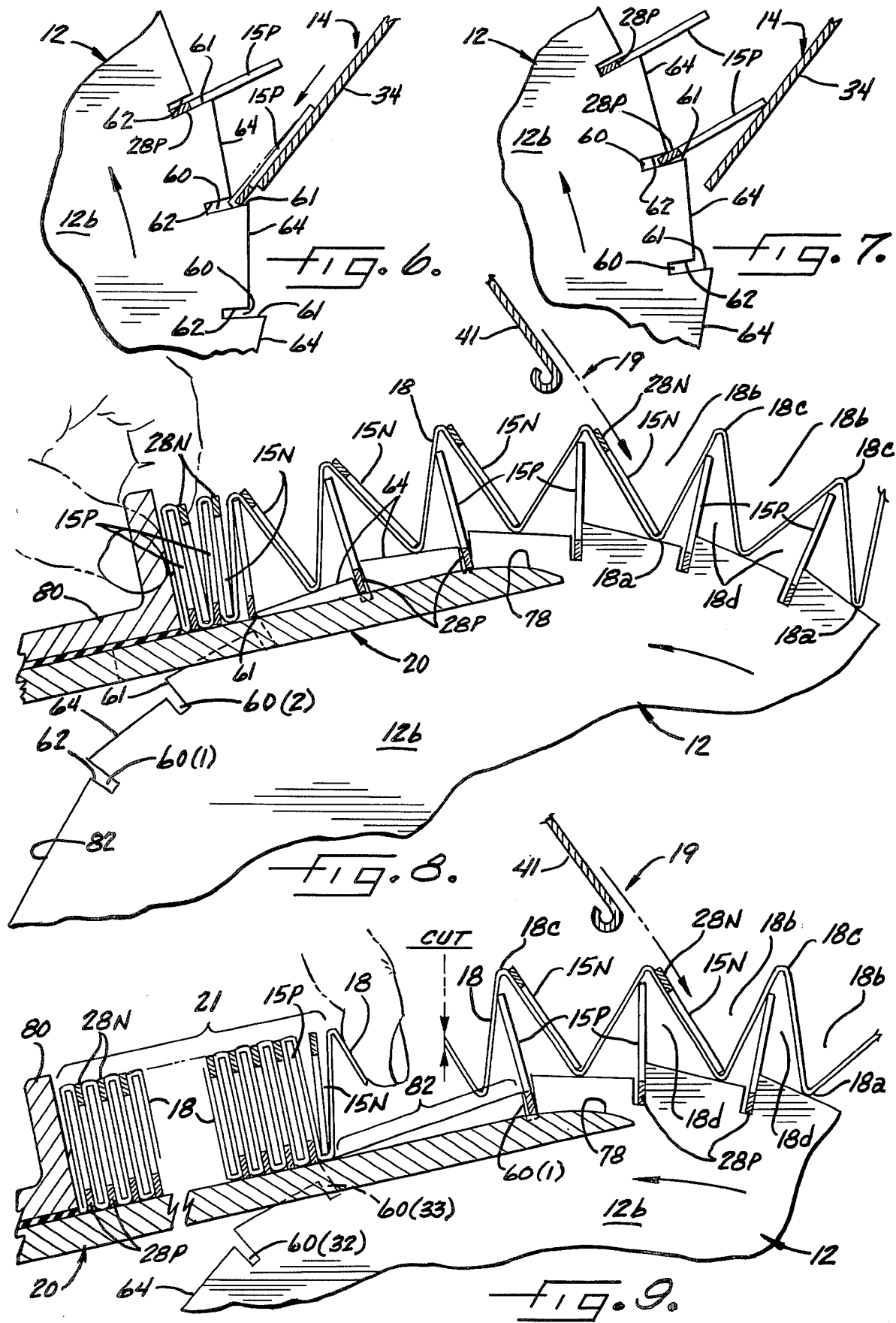

METHOD AND APPARATUS FOR ASSEMBLING BATTERY CELL ELEMENTS

RELATED APPLICATIONS

Sabatino et al., U.S. Ser. No. 381,227, filed May 24, 1982, for: Apparatus and Method for Assembling Battery Cell Elements.

Sabatino et al., U.S. Ser. No. 406,645, filed Aug. 9, 1982, for: Apparatus and Method for Supplying Electrode Plates in the Assembly of Battery Cell Elements.

Oswald and Lund, U.S. Ser. No. 245,795, filed Mar. 20, 1981, for: A Lead-Acid Battery Element Stack and Method of Making Same.

Klang and Rao, U.S. Ser. No. 352,924, filed Feb. 26, 1982, for: Lead-Acid Battery and Method of Making Same; a continuation-in-part of U.S. Ser. No. 245,772, filed Mar. 20, 1981.

DESCRIPTION OF THE INVENTION

The present invention relates generally to lead-acid storage batteries, and more particularly, to a method and apparatus for assembling the cell elements of such batteries.

Recent years have seen a number of developments in the lead-acid battery field for starting, lighting and ignition (hereinafter "SLI") applications. Klang et al. application Ser. No. 352,924 filed Feb. 26, 1982, assigned to the same assignee as the present application, discloses a substantially maintenance-free SLI battery having improved power characteristics per unit weight or volume. The battery disclosed in the Klang et al. application has cell elements which each comprise a relatively large number of small plates, ranging in number up to about 72 plates per cell or perhaps more, which are separated by a continuous accordian-folded insulator sheet. Because of the relatively large number of plates per cell and the use of an uninterrupted separator sheet, such SLI battery cell elements have not been amenable to high volume manual assembly, or to other assembly techniques heretofore used in making conventional battery cell elements having relatively fewer and larger plates separated by individual insulating spacers.

By virtue of the make-up of such SLI battery cell elements, efforts to automatically or efficiently assemble such elements have faced various problems. First, the large number of electrode plates utilized in each cell element presents inherent plate handling and alignment difficulties during assembly. Moreover, such cell element construction has tended to dictate the use of relatively complicated assembly equipment, which is expensive and more susceptible to breakdown. Frequent production breakdowns can significantly increase manufacturing costs, particularly if the assembly equipment is not susceptible to manual or manually assisted operation during repair periods.

It is an object of the present invention to provide a method and apparatus for the reliable assembly of battery cell elements having relatively large numbers of plates with a single interleaved spacer.

Another object is to provide a method and apparatus as characterized above that is adaptable for highly automated or manually assisted operation.

A further object is to provide a method and apparatus of the above kind in which the electrode plates of cell elements are automatically positioned into relatively precise, predetermined alignment during assembly so as to eliminate the necessity for subsequent plate alignment apparatus.

Still a further object is to provide an apparatus of the foregoing type which is relatively simple in construction, and thus economical to produce and reliable in operation.

Other objects and advantages of the invention will become apparent upon reading the following detailed description and upon reference to the drawings, in which.

Figure 1:
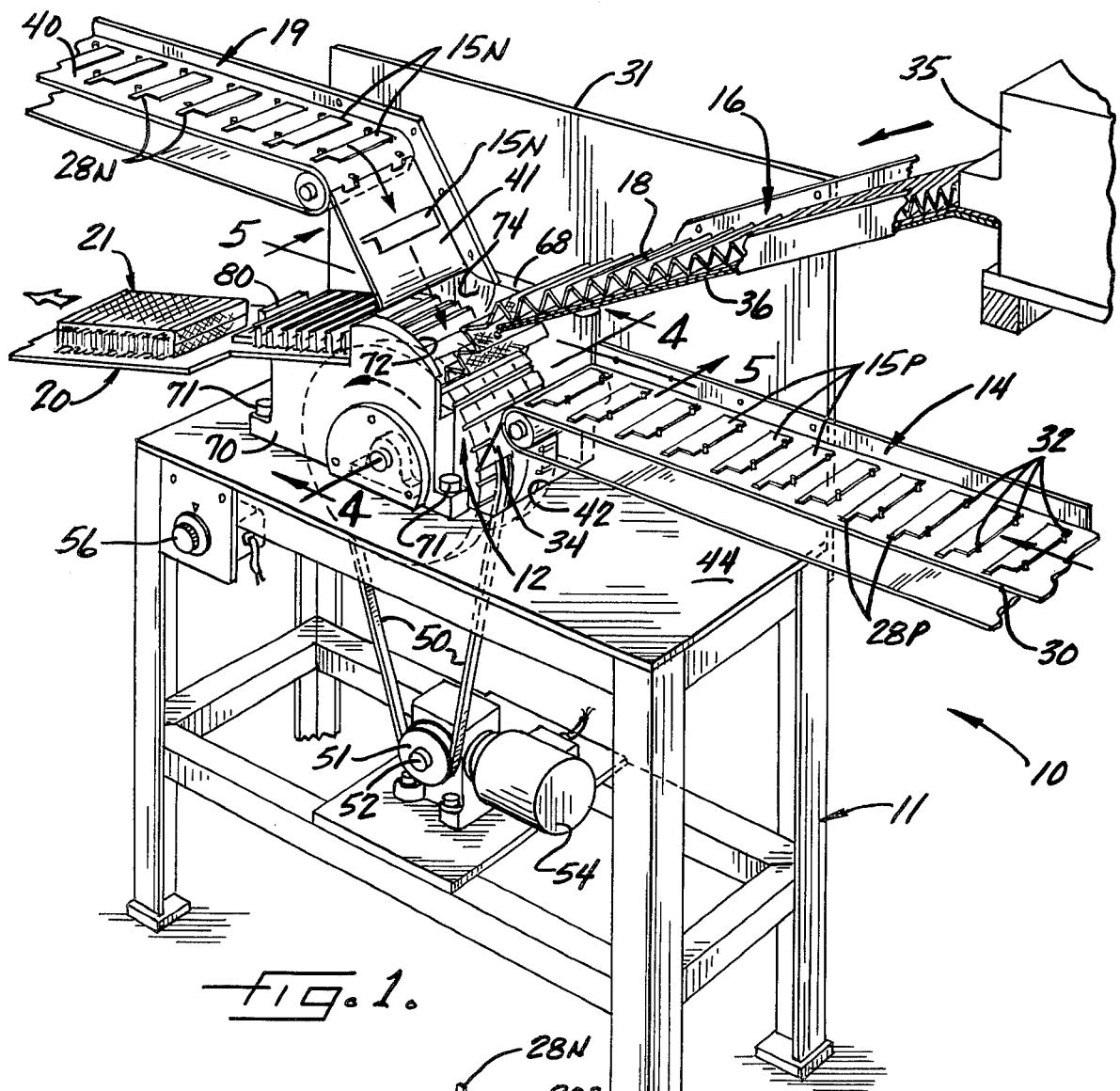
FIG. 1 is a partially diagrammatic perspective of an illustrative element assembly apparatus embodying the present invention.

FIGS. 4 and 5 are enlarged sections of the illustrative apparatus taken in the planes of lines 4—4 and 5—5, respectively, in FIG. 1;

FIGS. 6 and 7 are partially diagrammatic illustrations of the feed of electrode plates of one polarity to the element assembly drum of the illustrated apparatus;

FIG. 8 is a partially diagrammatic illustration of the feed of electrode plates of opposite polarity to the element assembly drum; and FIG. 9 is a partially diagrammatic illustration showing the removal of an assembled element stack from the illustrative apparatus.

While the invention is susceptible of various modifications and alternative constructions, a certain illustrated embodiment thereof has been shown in the drawings and will be described below in detail. It should be understood, however, that there is no intention to limit the invention to the specific form disclosed, but on the contrary, the intention is to cover all modifications, alternative constructions and equivalents falling within the spirit and scope of the invention.

Referring more particularly to FIG. 1 of the drawings, there is shown an illustrative element assembly apparatus 10 embodying the invention, which includes a stand 11, a rotary element-assembly drum 12 carried by the stand 11, a first plate supply 14 for feeding electrode plates 15P of common polarity to the rotary drum 12, a separator sheet supply 16 for feeding a continuous separator sheet 18 to the rotary drum 12, a second electrode plate supply 19 for feeding electrode plates 15N of common polarity opposite to the first plates 15P to the rotary drum 12, and a discharge ramp 20 for receiving and carrying assembled element stacks 21 away from the drum 12. Each electrode plate 15P, 15N, illustrated in FIG. 3, in this instance has an elongated rectangular configuration comprising a grid 25 which carries appropriate positive or negative active material 26, or its precursor. The plates 15P, 15N each have a respective integrally formed lug 28P, 28N located at an upper corner thereof.

For providing a continuous supply of electrode plates 15P to the rotary drum 12, the first plate supply 14 includes an endless power driven belt-conveyor 30 that is fixed at its downstream end to an upstanding back plate 31 of the stand 11. The belt of the conveyor 30 in this case has longitudinally spaced pairs of upstanding cogs 32 for moving a series of electrode plates 15P toward the drum 12 in predetermined spaced relation with the plate lugs 28P thereof commonly oriented to one side. It will be understood that the electrode plates 15P may be either manually positioned on the upstream end of the belt-conveyor 30, or alternatively, they may be dispensed onto the conveyor by appropriate automatic plate dispensing means operated in timed sequence with the conveyor. For guiding the electrode plates 15P from the conveyor 30 onto the drum 12, the belt conveyor 30 successively moves the electrode plates 15P onto a gravity feed-ramp 34 fixed to the downstream end of the conveyor 30 at a predetermined angle to the horizontal.

In order to provide for the continuous feed of a prefolded strip of separator sheet 18 to the rotary drum 12, the separator sheet feed 16 includes a sheet-pleating machine 35 of a known type, such as sold by Chandler Machine Co. of Ayer, Mass., which is operable for forming predetermined sized accordion-pleats or folds in a continuous length of material as it is directed through the machine. The separator sheet 18 may be of a known type of material, preferably being plastic formed with a ribbed texture so as to effectively separate and insulate adjacent electrode plates of an assembled cell element. A continuous strip of the separator sheet 18 may be fed to the pleating machine 35, such as from a supply roll, and the pleating machine 35 in this case discharges the pleated strip of separator sheet 18 onto an inclined feed-ramp 36. As best shown in FIG. 5, the strip of separator sheet 18 is formed with uniformly sized accordion-folds or pleats with lower apex points 18a of upwardly opening folds 18b riding on the feed-ramp 36 and upper apex points 18c of downwardly opening folds 18d lying in a plane substantially parallel to the plane of the lower apex points 18a. For impeding movement of the folded separator sheet 18 on the ramp 36 to the desired rate for feeding onto the drum, the ramp 36 has a rubber friction-liner 38.

For feeding the electrode plates 15N to the rotating drum 12, the second electrode plate supply 19 includes a belt-conveyor 40, similar to the conveyor 30, which successively deposits the electrode plates 15N onto a gravity feed-ramp 41 fixed at the discharged end of the conveyor. Again, the electrode plates 15N may be deposited onto the upstream end of the belt-conveyor 40 either manually, or by appropriate automatic plate dispensing means.

In accordance with the invention, the rotary drum is adapted to receive the continuous separator sheet and the first and second electrode plates in a sequence and manner that facilitates the continuous assembly of a battery cell element stack as the drum is rotated. More particularly, the rotary drum is adapted to successively receive and carry the first plates of common polarity in outwardly extended relation to the drum periphery, then receive the continuous separator sheet with the sheet assuming a loose serpentine or accordion-folded configuration with each of the first plates occupying a downwardly-opening fold on a common side of the sheet, and then upon further drum rotation, receive the second plates of opposite polarity in respective upwardly-opening folds of the separator sheet. Upon still further rotation of the drum, the separator sheet is positioned onto the discharge ramp with the first and second plates in properly assembled form occupying alternate folds on opposite sides of the sheet. To this end, the illustrated element-assembly drum 12 is mounted in an opening 42 in a top plate 44 of the stand 11 with the first plate feed-ramp 34, separator sheet feed-ramp 36, second plate feed-ramp 41, and discharge-ramp 20 all being disposed at circumferentially spaced locations about the drum 12. The drum 12 in this case comprises a central reduced-diameter hub 12a and a pair of axially spaced relatively large-diameter wheels 12b fixed to the hub by bolts 45 (FIG. 4). The drum 12 is mounted on a shaft 46 rotatably supported by bearing blocks 48 fixed to the top plate 44 by bolts 49.

To rotatably drive the drum 12, a drive belt 50 is trained about the reduced-diameter hub 12a and a sheave 51 carried on a gear-box output shaft 52 driven by an electric motor 54 supported by the stand 11 below the top plate 44 (FIG. 1). The drum hub 12a is formed with a circumferential groove 55 for receiving and retaining the drive belt 50 at a central location thereon. The drum 12 is driven in a counterclockwise direction, as viewed in FIGS. 1 and 5, so that peripheral points thereon successively pass the first plate feed-ramp 34, the separator sheet feed-ramp 36, the second plate feed-ramp 41, and the discharge-ramp 20. The motor 54 preferably is controlled by a variable-speed motor control 56 so that the drum 12 may be driven at desired rotary speeds.

For successively receiving the first electrode plates 15P from the gravity feed-ramp 34 and carrying such plates in radially extended relation to the outer periphery of the rotary drum, the drum wheels 12b are formed with a plurality of radially extending circumferentially spaced plate-receiving slots 60. The slots 60 of each wheel 12b are in axially aligned relation so as to receive and support a respective plate 15P between the ends thereof, as shown in FIGS. 4 and 5. To assist in the reliable feed of the first plates 15P into successive empty drum slots 60 as the drum is rotated, the slots 60 each are formed with a rear radial face 61 that extends outwardly a distance beyond a forward slot radial-face 62 and the end of each rear slot-face 61 is connected to the end of the successive forward slot-face 62 by a downwardly directed guide surface 64.

Hence, when a slot 60 of the rotating drum 12 approaches the end of the first plate gravity-feed ramp 34, as shown in FIGS. 5-7, a plate 15P may be directed down the feed ramp 34 such that it either strikes the protruding end of the rear slot-face 61 or the guide surface 64 forwardly of the slot which in turn guides the plate 15P onto the rear slot-face 61. With the plate 15P resting on the extended rear face 61, as shown in FIG. 6, further rotational movement of the drum 12 will pivot the plate 15P until the plate is aligned sufficiently with the slot 60 that it falls to the bottom of the slot 60, as shown in FIG. 7, and is thereafter held in radially extended relation to the drum as it is carried by the drum away from the feed-ramp 34. It will be understood by one skilled in the art that by appropriate controls, the first plate supply-conveyor 30 may be operated in timed relation to the rotary drum 12 such that an electrode plate 15P will be moved onto and down the gravity feed ramp 34 as each empty drum slot 60 reaches a position adjacent the end of the feed-ramp 34. Because of the outwardly projecting rear slot face 61 and the associated guide surface 64 extending forwardly thereof, it will be appreciated that variations in timing of the feed of plates 15P may be permitted without adversely affecting the feed to the drum. Preferably, however, the plates 15P are moved onto the gravity feed-ramp 34 such that they fall toward the drum immediately after the preceding plate has been lifted from the feed-ramp 34 by the drum.

To facilitate proper axial positioning of the first plates 15P within the drum slots 60, a vertical guide plate 68 is fixed by screws 69 to the back plate 31 immediately adjacent the rear side of the drum 12 and the rear side of the discharge end of first plates feed-ramp 34 (FIGS. 1, 4 and 5). For precise alignment of the first plates 15P as they are carried upwardly by the rotating drum 12, a second guide plate 70 is mounted to the top plate 44 of the stand by bolts 71 in upstanding relation immediately adjacent the forward side of the rotary drum 12 (FIGS. 1 and 4). The guide plate 70 is formed with an inwardly-converging cam surface 72 which is engaged by any forwardly protruding lugs 28P of the plates.

Following receipt of first plates 15P in the upwardly moving drum slots 60, further rotation of the drum 12 successively carries the first plates 15P past the end of the separator sheet feed-ramp 36 where a continuous strip of loosely folded separator sheet 18 is directed onto the rotating drum with each downwardly-opening sheet fold 18d encompassing a respective outwardly extended first plate 15P. By controlling the rate of sheet feed to the pleating machine 35, the incline of the gravity feed-ramp 36, and the frictional resistance of the rubber ramp liner 38, the flow of pre-folded separator sheet 18 can be controlled such that the sheet is pulled onto the rotating drum at a rate at which successive apexes 18a of the upwardly opening folds 18b fall between respective outwardly extended first plates 15P. As will become apparent, a machine operator preferably will be available to assure that the folded separator sheet 18 is properly drawn onto the rotating drum 12.

After feeding of the separator sheet 18 onto the drum 12, continued rotation of the drum carries the first plates 15P and the separator sheet 18 to a position adjacent the end of the second plate gravity feed-ramp 41 where second plates 15N of opposite polarity to the first plates 15P are successively directed into respective upwardly-opening folds 18b of the separator sheet, as best shown in FIGS. 5 and 8. Again, the speed of the second plate conveyor 40 may be appropriately controlled so as to feed the plates down the feed-ramp 41 in timed relation to the rotating drum 12. Since the upstanding first plates 15P provide relatively rigid support for the folded separator sheet 18, it is only necessary that the feed of the second plates 15N be timed such that second plates are directed into the spacing between adjacent first plates. The second plates 15N will thereupon settle in proper position in the bottom of the respective upwardly-opening sheet folds 18b. It has been found that once the second plates 15N have been fed into respective upwardly-opening folds of the separator sheet 18, the second plates 15N tend to hold or anchor the separator sheet in position on the drum so that the continued rotation of the drum pulls the separator sheet onto the drum from the feed ramp 36 at the proper feed rate. It will be appreciated that by proper orientation of the first and second plates 15P, 15N on the respective feed conveyors 30, 40, the plates can be assembled in the separator sheet 18 with their lugs 28P, 28N on opposite sides of a common end of the assembly, as shown, and as conventionally required for battery cell elements.

For guiding the second plates 15N into proper position in the folds of the separator sheet, the top of the rear guide plate 68 is formed with an inwardly-curved cam surface 74 that tends to direct the plates 15N into proper axial position as they fall from the feed ramp 41 (FIGS. 1 and 4). Each of the first and second plates 15P, 15N are positioned between the guide plates 68, 70 with the forwardly protruding lugs 28P, 28N engaging the cam surface 72 as the rotating drum 12 carries the plates and separator sheet, thereby camming the plates into relatively precise axial alignment on the drum. Further counterclockwise rotation of the drum will ultimately advance the first plates 15P, separator sheet 18, and second plates 15N to the discharge ramp 20, as shown in FIGS. 8 and 9.

In keeping with the invention, the discharge ramp 20 extends into the space between the drum wheels 12b immediately above the reduced diameter hub 12a for continuously receiving the separator sheet and assembled first and second plates from the rotating drum. The discharge ramp 20 has a curved upstream end portion 78, as shown in FIG. 8, upon which the first plates 15P are successively positioned and progressively moved by the drum 12 until such time as each first plate is completely removed from its respective plate-receiving slot 60 and the drum rotates free of the plate 15P. The first plates 15P, separator sheet 18, and second plates 15N can thereby be continuously deposited onto the discharge ramp 20 with the first and second plates 15P, 15N properly assembled in alternating folds 18d, 18b on opposite sides of the separator sheet 18.

For further folding the separator sheet 18 with first and second plates 15P, 15N assembled therein, a back-up bar 80 in this case is positionable on the discharge-ramp 20 at the beginning of each stack that is to be formed. The back-up bar 80 impedes discharge movement of the loosely folded separator sheet 18 and assembled plates 15P, 15N such that the sheet and plates are forced into a more tightly folded stack 21 as they are deposited onto the discharge ramp 20, as shown in FIGS. 8 and 9. The back-up bar 80 may be manually held and moved by the machine operator as the element stack 21 builds up on the discharge ramp, or alternatively, the back-up bar 80 may be of such size and weight that upon positioning onto the discharge ramp 20, it sufficiently impedes discharge of the separator sheet and plates so that they are forced into the tightly folded condition while being moved along the discharge ramp 20.

Figures 2, 3:
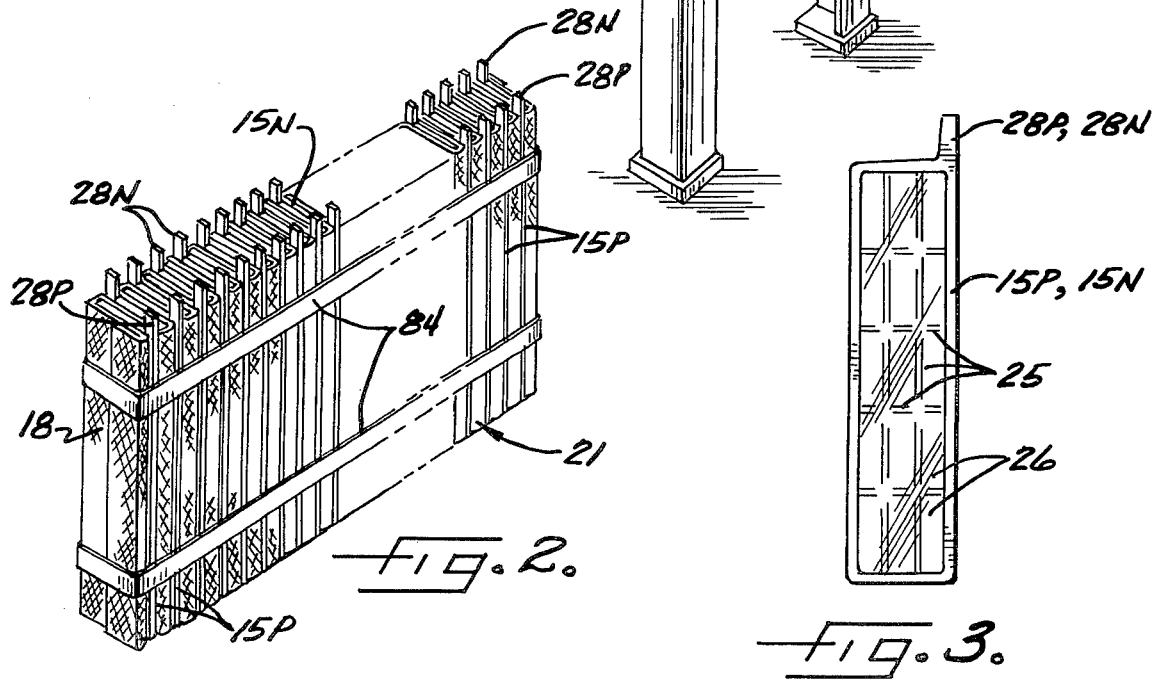
FIG. 2 is an enlarged perspective of a fully assembled battery cell element.
FIG. 3 is an enlarged side elevational view of a typical one of the electrode plates included in the battery cell element shown in FIG. 2.

After the rotary drum 12 has deposited the requisite number of first and second plates 15P, 15N onto the discharge ramp 20 for assembly of the desired sized element stack 21, the separator sheet 18 may be cut by the operator (FIG. 9). To assist the operator in determining when to cut the separator sheet 18, as well as providing additional space to effect the cutting, following passage of the requisite number of first plate receiving slots 60 at the discharge ramp 20, the rotary drum is formed with a relatively longer cutting space 82. The cutting space 82 may be made a distinct color so as to permit easy detection by the operator. It will be appreciated that when assembling an element stack 21 having, for example, 33 positive electrode plates 15P and 33 negative electrode plates 15N, the rotary drum 12 may be formed with 33 first plate-receiving slots 60, the last slot 60 (33) being separated from the first slot 60 (1) (as shown in FIGS. 5 and 9) by the cutting space 82. Each cycle of operation of the rotary drum 12 thereby effects the assembly of an element stack 21 having 66 plates. Alternatively, it will be appreciated that the rotary drum 12 could be formed with multiple series of 33 first plate receiving slots 60 about the periphery with each series of 33 slots being separated by a cutting space 82. In such case, each revolution of the rotary drum 12 would affect the assembly of a plurality of element stacks 21. Following assembly of each element stack 21 and cutting of the separator sheet 18, the assembled stack 21 may be removed from the discharge ramp 20, or moved along the ramp for further processing, such as processing through a taping mechanism where strips of tape 84 are applied to the stack to retain it in final form, as shown in FIG. 2.

From the foregoing, it can be seen that the apparatus 10 of the present invention is adapted for efficient and highly automated assembly of battery cell elements having relatively large numbers of electrode plates separated by a single interleaved spacer. The apparatus may be operated by a single operator whose primary duties are only to assure that separator sheet supply 16 and the first and second plate supplies 14, 19 are properly functioning, periodically position the back-up bar 80 at the beginning of each new element stack 21 that is being formed, and cut the separator sheet 18 at the cutting space 82 during each cycle of operation. In the event the downwardly opening folds 18d of the prefolded separator sheet 18 become misaligned so that they do not each encompass a respective outwardly extending first electrode plate 15P, this generally can be easily corrected by the operator without interrupting operation of the apparatus. Furthermore, in the event a malfunction occurs to either of the plate supplies 14, 19 which would require repairs, the apparatus still can be operated at a relatively high production level by manually feeding first and second plate 15P, 15N down the feed ramps 34, 41. Hence, the apparatus 10 is subject to both highly automated, as well as manually assisted operation. Finally, it is apparent from the foregoing, that the apparatus is of relatively simple construction, and thus, tends to be economical to produce and reliable in operation.

What is claimed is:

1. A method of assembling battery cell elements with a rotary drum having electrode plate-receiving means about the periphery thereof, comprising the steps of:
    rotatably driving said drum,
    positioning first plates of common polarity into said plate receiving means of said drum as said drum is rotated such that said plates are carried by said drum,
    positioning a strip of separator sheet over said first plates carried by said drum as said drum is rotated with said sheet assuming an accordion-folded configuration defining downwardly-opening folds each encompassing a respective one of said first plates and alternate upwardly-opening folds,
    positioning second plates of a common polarity opposite to said first plates successively in said upwardly-opening sheet folds as said drum is rotated, and
    continuously removing from said rotating drum said strip of separator sheet with said first and second plates occupying said alternate folds on opposite sides thereof.

2. The method of claim 1 including feeding a continuous strip of said separator sheet onto said drum, and then cutting said strip to the desired length for the size element to be assembled.

3. The method of claim 1 including folding said separator sheet into predetermined sized accordion-folds prior to positioning onto said drum, feeding said separator sheet onto said drum in loosely folded condition with each said first plate occupying a respective loose fold on a common side of said sheet, and positioning said second plates into alternate respective loose folds on the opposite side of said separator sheet.

4. The method of claim 1 including positioning said first plates into said plate receiving means at a first circumferential location adjacent said rotating drum, positioning said second plates onto said separator sheet on said rotating drum at a second circumferential location adjacent said drum, and positioning said separator onto said rotating drum at a circumferential location adjacent said drum between said first and second plate-positioning locations.

5. The method of claim 1 including removing said separator sheet and first and second plates from said drum by continuously depositing said sheet and plates onto a discharge ramp as said drum is rotated.

6. The method of claim 5 including further folding said separator sheet with said first and second plates occupying alternate folds therein into a relatively tightly folded assembly during removal of said sheet and plates from said rotating drum.

7. The method of claim 6 including further folding said sheet by restricting discharge movement of said sheet and first and second plates on said discharge-ramp.

8. The method of claim 1 including positioning said first plates into said plate receiving means by successively positioning said plates onto a first feed means that directs the plates into said plate receiving means of the rotating drum.

9. The method of claim 8 including successively moving said first plates onto said feed means in timed relation to said drum rotation.

10. The method of claim 8 including positioning said second plates by successively moving the plates onto a second feed means that directs the plates onto the separator sheet carried by said rotating drum.

11. The method of claim 10 including successively moving said second plates onto said second feed means in timed relation to said drum rotation.

12. The method of claim 1 including moving said first and second plates into predetermined axial positions on said drum as said plates and separator sheet are carried by said rotating drum.

13. The method of claim 12 including positioning said first plates into said plate receiving means at a first plate supply station adjacent said drum, feeding a continuous strip of said separator sheet onto said drum at a separator sheet supply station adjacent said drum, positioning said second plates onto said separate sheet at a second plate supply station adjacent said drum, removing said separator sheet and first and second plates from said drum at a discharge station adjacent said drum, and cutting said strip of separator sheet at said discharge station to the desired length for the size element to be assembled.

14. The method of claim 1 including positioning said first plates into said drum plate receiving means such that they are carried by said drum in radially extended relation to the periphery thereof.

15. An apparatus for assembling battery cell elements having a plurality of electrode plates of alternating polarity separated by a continuous interleaved separator sheet comprising:
    an element assembly drum mounted for rotating movement about a central axis and formed with plate receiving means about the periphery thereof,
    means for rotatably driving said drum,
    a first electrode plate supply station where first electrode plates of common polarity are positioned into plate receiving means of said drum as said drum is rotated with said drum supporting and carrying said first plates, a separator-sheet supply station where a strip of separator sheet is positioned over said first plates carried by said drum as said drum is rotated with said sheet assuming an accordion-folded configuration defining downwardly-opening folds each encompassing a respective one of said first plates and alternate upwardly opening folds therebetween, a second electrode plate supply station where second electrode plates of common polarity opposite to said first plates are positioned in said upwardly opening sheet folds as said drum is rotated, and an element-stack discharge station where said separator sheet is continuously removed from said rotating drum with said first and second plates occupying alternate folds on opposite sides thereof.

16. The apparatus of claim 15 in which said first plate supply station, said separator-sheet supply station, said second plate supply station, and discharge station are disposed at circumferentially spaced locations about said drum.

17. The apparatus of claim 16 in which said first plate supply station, separator-sheet supply station, and second plate supply station each include feed means having a discharge end in close proximity to the drum for respectively directing said first plates, separator sheet, and second plates onto said drum at determined circumferential locations.

18. The apparatus of claim 17 in which said plate supply stations each include a plate supply conveyor for transporting said first and second plates to said respective first and second plate feed means.

19. The apparatus of claim 17 in which said feed means for said first and second plates supply stations and said separator sheet supply station each includes a respective gravity feed ramp having a discharge in close proximity to the drum.

20. The apparatus of claim 15 in which said plate receiving means includes a plurality of slots formed at circumferentially spaced locations in said drum for receiving and supporting first plate positioned therein in outwardly extended relation to the drum periphery.

21. The apparatus of claim 15 in which said separator sheet supply station includes means for forming accordion-folds in a continuous strip of said separator sheet prior to positioning said separator sheet onto said rotating drum.

22. The apparatus of claim 15 in which said drum comprises a pair of side wheels and a central reduced diameter hub therebetween, and said element-stack discharge station includes a discharge ramp extending between said side wheels and away from said drum whereby said separator sheet and alternately disposed first and second plates positioned in alternate folds of said separator sheet carried by said drum are deposited onto said discharge ramp upon rotation of said drum as they arrive at said discharge ramp.

23. The apparatus of claim 22 in which said plate receiving means comprises a plurality of axially aligned slots in the peripheries of said side wheels, said slots each defining a forward-radial face and an adjacent rear-radial face, and said rear-radial face for each slot extending outwardly of the drum periphery a distance beyond the adjacent forward-radial face to form a ledge upon which first plates can be deposited during positioning into the drum slots.

24. An apparatus for assembling battery cell elements having a plurality of electrode plates of alternating polarity separated by a continuous interleaved separator sheet comprising:

an element assembly drum mounted for rotating movement about a central axis and formed with plate receiving means about the periphery thereof, means for rotatably driving said drum, first electrode plate feed means disposed adjacent said drum for directing first electrode plates of common polarity into said plate receiving means of said drum as said drum is rotated, separator sheet feed means for positioning a strip of separator sheet onto said drum and said first plates as said drum is rotated with said sheet assuming an accordion-folded configuration defining downwardly-opening folds each encompassing a respective one of said first plates and alternate upwardly-opening folds, second electrode plate feed means for directing second plates of a common polarity opposite to said first plates into said upwardly-opening sheet folds as said drum is rotated, and means for continuously removing from said rotating drum said separator sheet with said first and second plates occupying alternate folds on opposite sides thereof.

25. The apparatus of claim 24 in which said first plate feed means, said separator sheet feed means, said second plate sheet feed means, and said plate and sheet removing means are disposed at circumferentially spaced locations about said drum.

26. The apparatus of claim 25 in which said first plate feed means, separator sheet feed means, and second plate feed means each include a respective feed directing means having a discharge end in close proximity to the drum for respectively directing said first plates, separator sheet, and second plates onto said drum at determined circumferential locations.

27. The apparatus of claim 24 in which said plate receiving means comprises a plurality of radial slots formed in said drum at circumferentially spaced locations about the periphery thereof, said slots each defining a forward-radial face and an adjacent rear-radial face, and said rear-radial face for each slot extending outwardly of the drum periphery a distance beyond the adjacent forward-radial face to form a ledge upon which first plates can be deposited during positioning into the drum slots.

28. The apparatus of claim 27 in which the forward-radial face of each slot is connected to the rear-radial face of the succeeding slot by a guide surface for directing first plates onto the rearface ledge during feeding of plates into said drum slots.

29. The apparatus of claim 24 in which said first and second plate feed means includes respective first and second gravity feed ramps disposed at circumferential spaced locations adjacent to said rotating drum, and first and second guide members disposed adjacent opposite sides of said first and second plate ramps for directing said first and second plates in predetermined axial position on said rotating drum.

30. The apparatus of claim 29 in which at least one of said guide members is formed with an inwardly-conveying cam surface for progressively guiding said first and second plates into relatively precise axial position on said drum as said drum is rotated.

31. The apparatus of claim 24 in which said separator sheet feed means supplies a continuous strip of separator sheet to the rotating drum.

32. The apparatus of claim 31 in which said separator sheet feed means includes means for forming accordian folds in said continuous strip of separator sheet prior to positioning of said separator sheet onto said rotating drum.

33. The apparatus of claim 31 in which said plate receiving means includes a series of circumferentially spaced slots formed in said drum corresponding in number to the number of plates of common polarity to be assembled into a cell element.

34. The apparatus of claim 33 in which said series of circumferentially spaced slots is separated by a cutting space at the drum periphery to facilitate cutting of the strip of separator sheet upon completion of assembly of the requisite number of first and second plates for a cell element.

35. The apparatus of claim 31 in which said plate receiving means includes a plurality of series of circumferentially spaced plate-receiving slots formed in said drum, each said series of slots corresponding in number to the number of plates of common polarity to be assembled into a cell element, and each said series of slots being separated by a cutting space at the drum periphery for facilitating cutting of the strip of separator sheet upon completion of the assembly of the requisite number of first and second plates for a cell element.

36. The apparatus of claim 24 in which said plate and sheet removing means includes a discharge ramp upon which said sheet and assembled plates are continuously deposited during rotation of said drum, and movable element stack retaining means for supporting a forward end of the separator sheet and the first and second assembled plates as they are deposited onto said discharge ramp.

* * * * *